United States Patent [19]

Brownscombe et al.

[11] Patent Number: 4,465,797

[45] Date of Patent: Aug. 14, 1984

[54] REINFORCED POLYMER COMPOSITIONS AND THEIR PREPARATION

[75] Inventors: Thomas F. Brownscombe, Amsterdam, Netherlands; Frank D. Mango, Houston, Tex.

[73] Assignee: Shell Oil Company, Houston, Tex.

[21] Appl. No.: 514,076

[22] Filed: Jul. 15, 1983

[51] Int. Cl.$^3$ ................................................ C08K 9/04
[52] U.S. Cl. ................................ 523/216; 523/217; 523/466
[58] Field of Search ............... 523/209, 216, 217, 466; 106/308 N

[56] References Cited

U.S. PATENT DOCUMENTS 4,315,844  2/1982  Aboytes .............................. 523/216

FOREIGN PATENT DOCUMENTS 50-158650  12/1975  Japan .................................. 523/466
50-160367  12/1975  Japan .................................. 523/466
53-7456    3/1978   Japan .................................. 523/216
607836     5/1978   U.S.S.R. ............................. 523/216

OTHER PUBLICATIONS

Lee et al.; Handbook of Epoxy Resins; McGraw-Hill Book Co.; 1967; pp. 15-10 and 15-11.
Siffert and Biava; Clays and Clay Minerals 24 (1976), pp. 303-311; Chem. Abs. 87 (1977) 23767r.

*Primary Examiner*—Lewis T. Jacobs
*Attorney, Agent, or Firm*—Norris E. Faringer

[57] ABSTRACT

A reinforced polymer composition comprising an epoxy resin matrix having intimately distributed therein, as the reinforcing component, a particulate or filamentary silicate or aluminosilicate mineral modified, prior to being admixed with matrix resin, by having a layer of an organic isocyanate chemically bonded to its surface by covalent bonding.

6 Claims, No Drawings

REINFORCED POLYMER COMPOSITIONS AND THEIR PREPARATION

BACKGROUND OF THE INVENTION

1. Field of the Invention

This invention is directed to improvements in polymer compositions reinforced with particulate or filamentary mineral polymer-reinforcing agents. More particularly, this invention relates to thermosetting polymer resins reinforced with chemically modified mineral reinforcing agents.

2. Description of the Prior Art

Polymers are finding an increasing number of uses as structural materials. They are especially attractive as replacements for metals as, for example, in automotive applications, because of the reduction in weight that can often be achieved. However, for any particular application, a polymer by itself may not offer the combination of properties desired, and means to correct this deficiency are therefore of interest. In order to increase the rigidity and strength of polymers, it is a common practice to incorporate a quantity of filler, e.g., a natural or synthetic mineral material, in the particulate or filamentary form, e.g., as fibers or flakes. When the mixture of polymer and fibers or flakes is injection molded into a sheet form, the flow tends to cause the particles of filler to line up parallel to the sheet. If the particles have a high aspect ratio and have a high rigidity and strength, they will then constitute an effective reinforcement in the direction of alignment.

Several types of mineral fillers are in commercial use. The most frequently employed are glass fibers, asbestos fibers, clay-type minerals such as kaolin, calcium salts such as wollastonite and calcium carbonate and platy clay minerals such as talc and mica.

It is known that glass filaments must receive a chemical surface treatment or "sizing" in order to be effective as polymer reinforcement. Silicon compounds, such as polysiloxanes, are typically employed for this purpose to provide adhesion between the glass and the polymer. Other agents, such as "starch oil", provide lubrication; polymeric materials have been used to bind the fibers into a bundle.

In the case of normal sizing of glass fibers, the sizing compounds are not covalently bonded to the matrix. In such systems the glass fiber has a corrosion layer on the surface. This is a layer of etched glass which has had the alkali earth oxides leached out of it by water. On the surface of this corrosion layer there are islands of polysiloxanes deposited by the silane coupling agent. These islands of polysiloxanes are hydrogen bonded to the corrosion layer and not directly covalently bound to the matrix. It is well known that glass laminates treated with silane sizing agents lose strength on immersion in water. This is because the water diffuses along the surface of the glass fiber through this corrosion layer, wets the corrosion layer and lubricates the interface between the polysiloxane surface coat and the glass. This again demonstrates that the siloxanes are not directly bonded to the glass.

Another common surface finish for glass fibers is a family of chromium complexes, known as volanes. These have an ionic interaction with the surface of the mineral. It is not clear whether they are in fact ionically bonded, as is claimed for them, or whether they are hydrogen bonded like the silane compounds. In any event, they are not covalently bonded.

A variety of similar treatments have also been disclosed for mineral fillers other than glass fibers, especially mica and wollastonite. For example, it has been suggested to polymerize monomers such as methyl methacrylate, acrylonitrile or the like by a free radical mechanism to deposit a polymer on the mineral surface. On the basis of known reactivity of the different sorts of radicals it is expected that these polymers are not covalently bonded to the mineral surface.

My co-pending application No. 296,032, U.S. Pat. No. 4,405,727, issued Sept. 20, 1983, describes mineral reinforced non-elastomeric thermoplastic organic polymer compositions in which the reinforcing materials are particulate or filamentary mineral components having a very thin layer of certain polymeric organic compounds bonded by covalent chemical bonding to the surface of the mineral material. These chemically modified reinforcing compositions and methods of preparing them are described in detail in my co-pending application Ser. No. 257,834, U.S. Pat. No. 4,425,384, issued June 10, 1984.

Siffert and Biava; Clays and Clay Minerals 24 (1976) pp. 303–311; Chem. Abs. 87 (1977) 23767r, describe the reaction of hexamethylene diisocyanate (HMDI) with vermiculite in which the HMDI reacts with the vermiculite surface leaving "free" pendant isocyanate groups which are potentially capable of reaction with a polyol to form a polyurethane matrix. The urethane-forming reaction between an isocyanate group and a polyol is, of course, well recognized, and involves chemical reactions quite different from those involved in other forms of polymerization such as with epoxy resins.

SUMMARY OF THE INVENTION

It has been found that certain reinforced epoxy resin composites show improved mechanical properties when the reinforcement material has a covalently bound surface layer of isocyanate. Accordingly, the present invention provides a reinforced polymer composition comprising an epoxy resin matrix having intimately distributed therein, as the reinforcing component, a particulate or filamentary silicate or aluminosilicate mineral modified, prior to being admixed with matrix resin, by having a layer of an organic isocyanate chemically bonded to its surface by covalent bonding.

The invention comprises both the reinforced compositions described above, and also a method for preparing these compositions. That method of preparation comprises: contacting a particulate or filamentary silicate or aluminosilicate mineral, after heat cleaning to remove any surface contamination if necessary, with an organic diisocyanate, preferably in solution in an inert organic solvent such as cyclohexane, and mixing the resultant isocyanate modified mineral with an epoxy resin.

Compositions of this invention containing relatively small amounts, in the range from 10 to 30 phr (parts by weight per 100 parts by weight of resin), of the isocyanate modified reinforcing compositions exhibit superior retention, or increase, of desirable polymer properties, especially increased tensile modulus, compared to the use of the unmodified reinforcement.

DETAILED DESCRIPTION OF THE INVENTION

The resin reinforcing materials employed in this invention consist of a mineral substrate and a layer of an organic isocyanate which is bound to the substrate by covalent chemical bonding and is produced by chemical reaction between the substrate and an organic diisocyanate.

The Mineral Substrates

Minerals are commonly defined as solid elements or compounds occurring naturally in the earth's surface. For the purposes of this invention, the term "mineral materials" also includes synthetic materials such as silicas, silica-aluminas, and the like, i.e., synthetic minerals, but does not include metals as such.

The mineral substrates include the particulate or filamentary mineral materials which are known in the prior art as suitable for reinforcing organic polymer compositions, provided they have surface sites which are capable of covalent chemical bonding to an isocyanate.

The most common and generally preferred mineral reinforcing materials contain or consist of silicate or aluminosilicate minerals which have exposed surface silanol groups.

The group of suitable reinforcing materials includes silicate glasses; aluminosilicates, including mica, talc, clays (preferably bentonite or kaolin), vermiculite and asbestos.

The mica contemplated herein includes both natural and synthetic mica. Examples of natural mica include phlogopite, muscovite and biotite. Examples of synthetic mica include fluorophlogopite and barium disilicic. The chemical structure and description of mica is further described in Kirk-Othmer, "Encyclopedia of Chemical Technology", Second Edition, Volume 13, pages 398 et seq, and in Theng, "The Chemistry of Clay-Organic Reactions", John Wiley & Sons Publishers, pages 1–16 (1974). Vermiculite and montmorillonite are somewhat similar in structure and are also described in the above book passage by Theng. Talc, which is a high magnesium silicate, is described in Kirk-Othmer, Volume 19, pages 608 et seq.

For use in the present invention, the mineral substrates are in particulate or filamentary forms, such as used for polymer reinforcement in the prior art.

Particulate substrates may be naturally occurring or manufactured particles of various shapes. Particulate or filamentary substrates of any aspect ratio or geometry may be used. Especially suitable and preferred for polymer reinforcement to improve strength and stiffness or hardness are platy particles such as mica and vermiculite. Preferred dimensions for such platy reinforcements are 100 to 1000 microns in length and width and 1 to 6 microns in thickness. Especially preferred for improvement of strength and stiffness of the reinforced polymers are platy reinforcements of high aspect ratio, in the range from 20 to 200.

Filamentary substrates may be standard glass fibers, chopped or continuous or milled; or naturally fibrous minerals, such as asbestos. Conventional chopped glass fibers typically are 2 to 15 millimeters in length before use and 0.3 to 4 millimeters after they are compounded into a polymer matrix. Aspect ratios may be as low as 10.

The substrates for the invention should be relatively dry. Although 1 to 3% by weight of water is generally acceptable, it is preferred to employ substrates containing no more than about 0.2% wt of absorbed or adsorbed water. Substrates may therefore be suitably dried prior to use. Conventional drying methods, such as drying in moving air or inert gas at 100°–400° C., may suitably be used. Glass fibers for polymer reinforcement in their commercial form have an organic coating or surface layer. This may interfere with preparation of the composition of this invention. Such glass fiber should therefore be treated for removal of adhering organic material under known conditions, as by heating under air flow at a temperature of 450°–490° C.

The Isocyanates

The isocyanate should be of a type which will not only form a covalent bond with the surface of the glass or mineral substrate, but which after such reaction will yield a covalently bound surface layer having sufficient free isocyanate groups to permit reaction with polymers when used as reinforcement in the production of polymer composites. In order to obtain this result, it is necessary to use a diisocyanate, and aromatic diisocyanates, such as toluene diisocyanate and methylene phenylene diisocyanate, have been found particularly effective.

Formation of Isocyanate-Coated Mineral

As indicated above, fibers of silicate glass often have an organic coating or surface layer which can interfere with the desired covalent bond-forming reaction with the isocyanate, while aluminosilicate minerals may also have surface contamination which can impair that reaction. Accordingly, it is often desirable to subject the mineral substrate to a preliminary heat treatment to remove any such surface contamination. Such heat cleaning treatments are well known to those skilled in the art, and suitably comprise heating to a temperature of at least 400° C. After such heat cleaning, the mineral substrate is then contacted with the isocyanate. This is conveniently effected by mixing the substrate with a solution of the isocyanate in an inert organic solvent, e.g., cyclohexane, and heating, suitably at the reflux temperature of the solvent. After an appropriate period, e.g., 1–3 hours, the mixture is then cooled and the solid, coated substrate filtered off. Often, it is advantageous to include in the substrate/isocyanate reaction mixture a material which will catalyze the formation of the covalent link between the isocyanate and the surface of the substrate; suitable such materials include dibutyl tin dilaurate, stannous octoate and diaminobicyclooctane. As shown in the illustrative examples, the fully-prepared solids were generally given multiple washes with a hydrocarbon solvent, typically the same as that in which the product had been prepared. Such washes are desirable since they remove non-bonded isocyanate material, though they are not essential to the practice of the invention.

Preparation of the Reinforced Resin Composites

The isocyanate-modified minerals may be used to reinforce any epoxy resin, using methods known for the production of mineral-filled polymers. A major difference, however, is that according to this invention the mineral reinforcements may be present in much lower concentrations, in the range from 10–30 phr, suitably in concentrations of about 25 phr, compared to conventional filled polymers which typically contain 40 phr or more of filler; however, the reinforcements of this invention may be used in much higher concentrations if required by special applications.

The filled composition may be prepared, for example, by mixing the desired amount of reinforcing material with particulate resin and submitting the mixture to conditions at which the modified mineral is incorporated in the resin, e.g., by compounding the mixture by means of a melt-mixing device, such as an extruder or Banbury compounder, either for direct use, as in injection molding or extrusion of sheet or other desired profiles, or for pelletizing to provide a saleable reinforced resin. Because of the improved adhesion of these fillers to the resin matrix, it is desirable to avoid conditions during blending of the fillers with the resin which result in excessive attrition or fragmentation of these fillers.

The invention is further illustrated by the following examples. These are given for the purpose of illustration only and are not meant to limit the invention to the particular reactants and conditions employed therein.

Preparation of Reinforcing Solids

Example 1: Isocyanate Coating of Mica

A one liter vessel was charged with 20.07 g of mica ("Suzorite", a form of phlogopite, nominally 60 mesh, having a high aspect ratio, which had been heat cleaned at 400° C.), 250 ml cyclohexane (spectograde dry, dried over 4 Å sieves), 0.04 ml dibutyl tin dilaurate and 10 ml toluene diisocyanate. The mixture was refluxed with stirring under nitrogen flow for two hours, and the mica transferred to 350 ml medium glass frit funnel and washed with 500 ml dry cyclohexane. The mica was transferred to a beaker, approximately 200 ml cyclohexane added and the mixture stirred. The mica was then filtered off and dried in a vacuum desiccator.

Example 2: Isocyanate Coating of Glass

A one liter round bottomed flask was charged with 115 g of glass fiber (PPG 450, which had been heat cleaned at 470°–500° C. for 1½ hours), 780 ml cyclohexane, 0.04 ml dibutyl tin dilaurate and 8.8 ml toluene diisocyanate. The mixture was refluxed with stirring for two hours, then purged with nitrogen and left overnight under nitrogen pressure. The glass was filtered off, allowed to sit for 10 minutes, immersed in cyclohexane, filtered again and the wash repeated twice, after which the glass was dried in a vacuum desiccator.

Example 3: Characterization of Isocyanate Coating on Glass

The technique used to analyze the surface layers discussed in this application was X-ray photoelectron spectroscopy (XPS), also known as "Electron Spectroscopy for Chemical Analysis" (ESCA). In this technique, a material is bombarded with X-rays which eject photoelectrons from the core levels of the atoms in the substrate material. The energy of these electrons is determined by the energy levels of the electrons in the various atoms and the distribution of electrons of various energies is determined by the numbers of different types of atoms present and the response of each of the various electrons in the atom to that particular type of X-ray. It is well known that the response factors of the various elements may be tabulated and elemental analysis may be performed on surfaces by using this equipment. The coated reinforcements described in this patent application have been analyzed by ESCA. By comparing the ESCA results obtained on (1) an untreated substrate, (2) a substrate after isocyanate treatment, as described in the examples; and (3) a treated substrate after contact with solvents under conditions at which coatings which are not chemically bound would be removed, it has been determined that the isocyanate is incorporated on the surfaces of the reinforcement materials in such a way that it cannot be washed off or extracted by appropriate solvents, hence there is chemical bonding between the substrate and the isocyanate.

The following Table shows the results of ESCA analysis of the heat cleaned glass before and after treatment with toluene diisocyanate; in each case the number of atoms recorded is standarized to 62 kilocounts per second from the copper electrode.

TABLE

| Element | | C | N | Si | Ca | Na | O |
|---|---|---|---|---|---|---|---|
| Relative number of atoms | Before TDI treatment | 55 | <0.5 | 37 | 8.9 | 3.1 | 126 |
| | After TDI treatment | 71 | 17 | 9.8 | 2.8 | 0.9 | 41.0 |

The most significant difference is clearly in the nitrogen figures, since this element is present in isocyanate, but not in the untreated glass and thus functions as an "atomic label" for the presence of the isocyanate. It will also be seen that the treated surface not only records a high nitrogen reading, due to the TDI, but also a significant drop in silicon intensity indicating that the silicon is covered more deeply than is the treated glass.

The ESCA results of the TDI treated glass did not change significantly after exposure to solvent extraction in a Soxhlet, indicating that the isocyanate layer is tightly attached by chemical bonding.

Preparation of Reinforced Resin Composites

Curing agent, resin, and treated filler prepared as described previously were mixed in a polyethylene bag to provide 350 g to 400 g of filler liquid resin mixture. For Agent Z, a ratio of 20 parts of curing agent to 100 parts of epoxy resin was employed; for triethylene tetraamine, 14 parts of curing agent per 100 parts of epoxy resin. The bag was kneaded firmly for 1 to 2 minutes to mix the contents, excess air drawn off, and was sealed with a tie.

The bag was then placed in a hydraulically operated cylinder, and a pressure of 300 psi applied to it, causing it to rupture and forcing the contents through a ¾" diameter steel line into a resin transfer mold of interior dimensions ⅛" by 8" by 10". When the mold was filled, the pressure was removed, and the part was cured by electrically heating the mold. This was then cut into standard ASTM tensile test bars.

Test Methods for Mechanical Properties

Flexural modulus was determined using a three point bend testing fixture with a 2.00 inch span between load reaction points. A load of a magnitude such that the maximum tensile bend stress would remain below 1500 psi, according to the formula:

$$\sigma_{max} = \frac{2}{3} \frac{P \times L}{w \times t^2}$$

where
$\sigma_{max}$ = maximum tensile bend stress
P = applied load
L = span between load reaction points
t = specimen thickness
w = specimen width.

The selected load was slowly applied and maintained for one minute, which permitted some inelastic strain relaxation to take place and for the deflection to reach a steady, reproducible value. The flexural modulus was calculated using the elementary bending formula for a simple beam subject to three point bending.

Tensile tests were performed using a model TTC Instron testing machine and a microformer extensionmeter (Baldwin) attached to the gage section of the standard injection molded tensile test bar. The total length of the straight portion of the gage section was 2.75 inches. The nominal cross sectional dimensions were ½ inch × ⅛ inch. Thin strips of adhesive tape were introduced between the surface of the specimen and the knife edges of the extensionmeter to prevent failure from indentation stresses. Extensionmeter sensitivity was a chart motion of 2 inches for a strain of 1%. The crosshead motion was set at 0.005 inches/minute corresponding to a strain rate of 0.0018 minute$^{-1}$ at the gage section. Yield stress and % elongation to fracture were obtained from the tensile test.

Example 4

EPON ® 828 epoxy resin, incorporating Agent Z (an aromatic amine curing agent), composites were prepared and tested as described above using, as reinforcement, either heat cleaned mica (Suzorite, 60 mesh) or glass fiber, or comparable products which had been coated with toluene diisocyanate (TDI) as described in Example 1 or 2. The composites were cured in two stages, and the results are set out in Table 1 below.

TABLE 1

| Reinforcement | | Curing Conditions | Mechanical Properties of Composite | | | |
|---|---|---|---|---|---|---|
| | | | Flexural Modulus, | Tensile Modulus, | Stress to fracture | Elongation to break, |
| Type | % | °C./hours | psi × 10$^5$ | psi × 10$^5$ | psi × 10$^3$ | % |
| Unfilled | | 80/2; 150/2 | 4.24 | 6.26 | 6.5 | 1.9 |
| " | | 80/17; 150/2 | 4.11 | 4.39 | 10.9 | 7.2 |
| Glass | 15 | 80/2; 150/2 | 6.57 | 7.61 | 5.2 | 0.76 |
| TDI-Glass | 16 | 80/2; 150/2 | 7.13 | 10.8 | 5.1 | 0.60 |
| Mica | 25 | 85/16 150/1 | 14.0 | 5.0 | 8.0 | 1.31 |
| TDI-Mica | 25 | 80/16 150/1 | 13.1 | 15.5 | 8.1 | 0.7 |

Example 5

Epoxy resin composites were prepared following a procedure similar to that described in Example 4 above, except that TETA (triethylene tetramine) was used in place of Agent Z. The mineral filler used was either (i) heat cleaned—but otherwise untreated—mica (Suzorite 60), (ii) such a mica which had been coated with TDI as described in Example 1, or (iii) such a TDI-coated mica which had been post-treated with either Agent Z or a low molecular weight polybutadiene (PBD). The composites were cured in two stages, and the results of their mechanical testing are set out in Table 2 below.

TABLE 2

| Reinforcement | Curing Conditions | Mechanical Properties of Composite | | | |
|---|---|---|---|---|---|
| Type | °C./hours | Flexural Modulus, psi × 10$^5$ | Tensile Modulus, psi × 10$^5$ | Stress to fracture psi × 10$^3$ | Elongation to break, % |
| Mica | 105/0.1 | 597 | 760 | 2.9 | 0.45 |
| Mica-TDI | 102/0.1 | 1010 | 980 | 2.6 | 0.4 |
| Mica-TDI-Agent Z | 100/0.1 | 1210 | 1120 | 2.7 | 0.31 |
| Mica-TDI-PBD | 100/0.1 | 1440 | 1320 | 4.0 | 0.4 |

From these results, it is clearly apparent that the presence of the TDI coating on the filler results in a considerable increase in the tensile modulus of the filled epoxy composite (especially in the case of TDI-coated mica).

What is claimed is:

1. A method for preparing a reinforced polymer composition which comprises:
    (a) contacting a particulate or filamentary silicate mineral with an organic diisocyanate in the presence of a material which will catalyze the formation of the covalent link between the mineral surface and the diisocyanate, and
    (b) admixing the resulting isocyanate-modified mineral with an epoxy resin.

2. The method of claim 1 wherein, prior to contact with the diisocyanate, the mineral is heated to remove any surface contamination.

3. The method of claim 1 wherein the diisocyanate is an aromatic diisocyanate.

4. The method of claim 1 wherein the mineral is contacted with a solution of the diisocyanate in an inert organic solvent.

5. The method of claim 1 wherein the inert organic solvent is cyclohexane.

6. The method of claim 1 wherein the catalyst material is dibutyl tin dilaurate.

* * * * *